United States Patent
Stempel et al.

(10) Patent No.: US 10,108,419 B2
(45) Date of Patent: Oct. 23, 2018

(54) DEPENDENCY-PREDICTION OF INSTRUCTIONS

(71) Applicant: QUALCOMM Incorporated, San Diego, CA (US)

(72) Inventors: Brian Michael Stempel, Raleigh, NC (US); James Norris Dieffenderfer, Apex, NC (US); Michael Scott McIlvaine, Raleigh, NC (US); Melinda Joyce Brown, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 14/498,938

(22) Filed: Sep. 26, 2014

(65) Prior Publication Data

US 2016/0092221 A1    Mar. 31, 2016

(51) Int. Cl.
*G06F 9/40* (2006.01)
*G06F 9/42* (2006.01)
(Continued)

(52) U.S. Cl.
CPC ...... *G06F 9/30072* (2013.01); *G06F 9/30149* (2013.01); *G06F 9/38* (2013.01);
(Continued)

(58) Field of Classification Search
CPC .... G06F 9/30072; G06F 9/30149; G06F 9/38; G06F 9/3804; G06F 9/3806;
(Continued)

(56) References Cited

U.S. PATENT DOCUMENTS 6,179,490 B1 * 1/2001 Pruitt .................. G06F 8/34
                                                            715/853
6,571,331 B2    5/2003 Henry et al.
(Continued)

OTHER PUBLICATIONS

International Search Report and Written Opinion—PCT/US2015/048959—ISA/EPO—dated Dec. 9, 2015.
(Continued)

*Primary Examiner* — Daniel H Pan
(74) *Attorney, Agent, or Firm* — Muncy, Geissler, Olds & Lowe, P.C./Qualcomm

(57) ABSTRACT

Systems and methods for dependency-prediction include executing instructions in an instruction pipeline of a processor and detecting a conditionality-imposing control instruction, such as an If-Then (IT) instruction, which imposes dependent behavior on a conditionality block size of one or more dependent instructions. Prior to executing a first instruction, a dependency-prediction is made to determine if the first instruction is a dependent instruction of the conditionality-imposing control instruction, based on the conditionality block size and one or more parameters of the instruction pipeline. The first instruction is executed based on the dependency-prediction. When the first instruction is dependency-mispredicted, an associated dependency-misprediction penalty is mitigated. If the first instruction is a branch instruction, the mitigation involves training a branch prediction tracking mechanism to correctly dependency-predict future occurrences of the first instruction.

30 Claims, 5 Drawing Sheets

(51) Int. Cl.
*G06F 9/44* (2018.01)
*G06F 9/30* (2018.01)
*G06F 9/38* (2018.01)

(52) U.S. Cl.
CPC .......... *G06F 9/3836* (2013.01); *G06F 9/3842* (2013.01); *G06F 9/3885* (2013.01)

(58) Field of Classification Search
CPC .... G06F 9/3842; G06F 9/3844; G06F 9/3846; G06F 9/4848; G06F 9/3885
USPC .................................................. 712/239, 240
See application file for complete search history.

(56) References Cited

U.S. PATENT DOCUMENTS

| | | |
|---|---|---|
| 7,404,070 B1 | 7/2008 | Patil et al. |
| 2003/0172258 A1* | 9/2003 | Krishnan ............... G06F 9/3867 712/234 |
| 2004/0003213 A1* | 1/2004 | Bockhaus ............. G06F 9/3806 712/233 |
| 2004/0123075 A1* | 6/2004 | Almog .................. G06F 9/3844 712/207 |
| 2005/0154859 A1 | 7/2005 | Gilkerson |
| 2006/0200653 A1 | 9/2006 | Blasco et al. |
| 2012/0089823 A1 | 4/2012 | Jin et al. |
| 2013/0007425 A1 | 1/2013 | Cantin et al. |

OTHER PUBLICATIONS

Pnevmati Katos D N., et al., "Guarded Execution and Branch Prediction in Dynamic ILP Processors", Proceedings of the Annual International Symposium on Computer Architecture, Chicago, Apr. 18-21, 1994, [Proceedings of the Annual International Symposium on Computer Architecture], Los Alamitos, IEEE Comp. Soc. Press, US, vol. SYMP. 21, Apr. 18, 1994 (Apr. 18, 1994), pp. 120-129, XP010098139, DOI: 10.1109/ISCA.1994.288156 ISBN: 978-0-8186-5510-4 the whole document.

* cited by examiner

| Lane A | Lane B | Lane C | Lane D | |
|---|---|---|---|---|
| T16 | T16 | T16 | T16 | 202 |
| T16 | T16 | T16 | T32 – first half | 204 |
| T16 | T16 | T32 – first half | T32 – second half | 206 |
| T16 | T32 – first half | T32 – second half | T16 | 208 |
| T16 | T32 – first half | T32 – second half | T32 – first half | 210 |
| T32 – first half | T32 – second half | T16 | T16 | 212 |
| T32 – first half | T32 – second half | T16 | T32 – first half | 214 |
| T32 – first half | T32 – second half | T32 – first half | T32 – second half | 216 |

TABLE 1

FIG. 2A

| Fetch Group/ Clock Cycle | Block Size/ Remaining Block Size | Lane A | Lane B | Lane C | Lane D | Guess |
|---|---|---|---|---|---|---|
| First | N/A | ITTE/ ITTT | T16NOP | T16NOP | T16B | B is shadow (correct) — 252 |
| First | N/A | ITT/ ITE | T16NOP | T16NOP | T16B | B is shadow (wrong) — 254 |
| Second | 4 | T16NOP | T16NOP | T16NOP | T16B | B is shadow (correct) — 256 |
| Second | 3 | T16NOP | T16NOP | T16NOP | T16B | B is shadow (wrong) — 258 |
| Second | 2 | T32NOP | | T32B | | B is shadow (correct) — 260 |
| Second | 2 | T16NOP | T16NOP | T16NOP | T16B | B is shadow (wrong) — 262 |
| Second | 1 | T16NOP | T16B | T16NOP | T16B | B is NOT shadow (correct) — 264 |
| Second | 1 | T16NOP | T16B | T16NOP | T16NOP | B is shadow (wrong) — 266 |

TABLE 2

FIG. 2B

DEPENDENCY-PREDICTION OF INSTRUCTIONS

FIELD OF DISCLOSURE

Disclosed aspects relate to dependency-prediction of instructions executed in an instruction pipeline. More particularly, some aspects are directed to predicting whether one or more instructions are dependent instructions of conditionality-imposing control instructions, and in the case of incorrect predictions of dependency, mitigating associated penalties.

BACKGROUND

Conditional execution of instructions is a conventional feature of processing systems. An example is a conditional instruction, such as a conditional branch instruction, where the direction taken by the conditional branch instruction may depend on how a condition gets resolved. For example, a conditional branch instruction may be represented as, "if <condition1> jump1," wherein, if condition1 evaluates to true, then operational flow of instruction execution jumps to a target address specified by the jump1 label (this scenario may also be referred to as the branch instruction (jump1) being "taken"). On the other hand, if condition1 evaluates to false, then the operational flow may continue to execute the next sequential instruction after the conditional branch instruction, without jumping to the target address. (This scenario is also referred to as the branch instruction not being taken, or being "not-taken"). Under certain instruction set architectures (ISAs), instructions other than branch instructions may be conditional, where the behavior of the instruction would be dependent on the related condition.

In general, the manner in which the condition of a conditional instruction will be resolved will be unknown until the conditional instruction is executed. Waiting until the conditional instruction is executed to determine the condition can impose undesirable delays in modern processors which are configured for parallel and out-of-order execution. The delays are particularly disruptive in the case of conditional branch instructions, because the direction in which the branch instruction gets resolved will determine the operational flow of instructions which follow the branch instruction.

In order to improve instruction level parallelism (ILP) and minimize delays, modern processors may include mechanisms to predict the resolution of the condition of conditional instructions prior to their execution. For example, branch prediction mechanisms are implemented to predict whether the direction of the conditional branch instruction will be taken or not-taken before the conditional branch instruction is executed. If the prediction turns out to be erroneous, the instructions which were incorrectly executed based on the incorrect prediction will be flushed. This results in a penalty known as the branch misprediction penalty. If the prediction turns out to be correct, then no branch misprediction penalty is encountered.

Branch prediction mechanisms may be static or dynamic. Branch prediction itself adds latency to a pipeline, otherwise known as the branch prediction penalty. When an instruction is fetched from an instruction cache and processed in an instruction pipeline, branch prediction mechanisms must determine whether the instruction that is fetched is a conditional instruction and whether it is a branch instruction and then make a prediction on the likely direction of the conditional branch instruction. It is desirable to minimize stalls or bubbles related to the process of branch prediction in an instruction execution pipeline. Therefore, branch prediction mechanisms strive to make a prediction as early in an instruction pipeline as possible. Sometimes, pre-decode bits or metadata related to branch instructions are stored in the instruction cache, which enables acceleration of the branch prediction. Such pre-decode bits may include information pertaining to the branch type (e.g., as it relates to a program counter (PC) value, whether it is a direct or indirect branch, whether it is a return from a subroutine, etc.). Pre-decode bits can also include information about conditionality of branch instructions.

While the above prediction mechanisms exist for conditional instructions such as conditional branch instructions whose conditionality is provided within the conditional instruction itself, there is another class of instructions which are harder to predict. This class includes a block of one or more dependent instructions whose behavior is controlled by a conditionality-imposing control instruction. For example, some processor ISAs include a so-called If-Then (IT) class of instructions. The IT instructions control the behavior of an IT block of one or more dependent instructions by imposing conditionality on the one or more dependent instructions. The dependent instructions in the IT block follow the IT control instruction. More specifically, the IT control instruction may have an "If" condition, based on the resolution of which, the behavior of one or more dependent "Then" instructions are determined. In this manner, the use of IT instructions makes it possible to control the behavior of a block of one or more dependent instructions. For example, an "ITTTT" block may include an "If" instruction with a condition, followed by four "Then" instructions whose behavior depends on how the conditionality-imposing "If" control instruction evaluates. In this manner, programming efficiency may be achieved for cases where a block of one or more instructions are dependent on the same condition.

These dependent instructions are difficult to predict using the above-described prediction mechanisms for conventional conditional instructions, because the behavior of the dependent instructions is controlled by the conditionality-imposing control instruction. If the same instructions that constitute the dependent instructions are not preceded by a conditionality-imposing control instruction, then their behavior is unconditional. Thus, the likely behavior of a dependent instruction cannot be stored in pre-decode bits of the dependent instructions themselves. In other words, prediction of the likely behavior of a dependent instruction which is an unconditional branch instruction, for example, is difficult because the branch instruction, by itself is unconditional and should always be predicted as "taken." However, the actual direction of the branch instruction is dependent on the conditionality-imposing control instruction, and thus, the behavior of the branch instruction may effectively be "taken" or "not-taken."

Moreover, it is sometimes not possible to know in advance whether a particular instruction is a dependent instruction of a conditionality-imposing control instruction. This is because the code block containing the conditionality-imposing control instruction and the corresponding dependent instructions may straddle cache line boundaries in instruction memories. Moreover, a conditionality-imposing control instruction may come in many types and affect a varying number of dependent instructions based on the block size (i.e., number of one or more dependent instructions in the code block) of the conditionality-imposing control instruction. ISAs which support the ARM architecture, for example, include a class of instructions known as THUMB instructions. The THUMB instructions may be 32-bits or 16-bits. Since THUMB instructions come in multiple instruction lengths, it is not possible to know when processing the conditionality-imposing control instruction (e.g., the IT instruction), whether the corresponding dependent instructions will be contained within the same cache line since the number of bytes in the code block of the IT instruction would be dependent on the length of each dependent instruction.

Conventional methods of handling execution of such dependent instructions tend to be inefficient, complex, and time consuming. The conventional methods operate by reducing the execution frequency of the processor in order to allow sufficient time to ascertain the conditionality of the dependent instructions from the conditionality-imposing control instruction. Alternatively, the conventional methods introduce pipeline stalls in order to resolve the condition before executing the dependent instructions or move the resolution of the conditionality to a later pipeline stage, thus increasing branch prediction penalty. Thus, there is a need in the art to avoid the aforementioned drawbacks of conventional methods.

SUMMARY

Exemplary aspects of the invention are directed to systems and methods for executing instructions in an instruction pipeline of a processor.

For example, an exemplary aspect is directed to a method for executing instructions in an instruction pipeline of a processor, wherein the method comprises: detecting a conditionality-imposing control instruction which imposes dependent behavior on a conditionality block size number of one or more dependent instructions. Prior to executing a first instruction, the method includes dependency-predicting that the first instruction is a dependent instruction of the conditionality-imposing control instruction, based on the conditionality block size and one or more parameters of the instruction pipeline and executing the first instruction based on the dependency-prediction. When the first instruction is dependency-mispredicted, a penalty associated with the dependency-misprediction is mitigated.

Another exemplary aspect is directed to processing system comprising a processor configured to execute instructions in an instruction pipeline. The processing system includes dependency prediction logic configured to: detect a conditionality-imposing control instruction which imposes dependent behavior on a conditionality block size number of one or more dependent instructions, and prior to executing a first instruction, dependency-predict that the first instruction is a dependent instruction of the conditionality-imposing control instruction, based on the conditionality block size and one or more parameters of the instruction pipeline. The processor is configured to execute the first instruction based on the dependency-prediction. The processing system further includes logic configured to mitigate a penalty associated with the dependency-misprediction when the first instruction is dependency-mispredicted.

Yet another exemplary aspect is directed to processing system comprising: means for executing instructions in an instruction pipeline, means for detecting a conditionality-imposing control instruction which imposes dependent behavior on a conditionality block size number of one or more dependent instructions, means for dependency-predicting that the first instruction is a dependent instruction of the conditionality-imposing control instruction, based on the conditionality block size and one or more parameters of the instruction pipeline, prior to executing a first instruction, wherein the means for executing the instructions in the instruction pipeline comprises means for executing the first instruction based on the dependency-prediction, and means for mitigating a penalty associated with the dependency-misprediction, when the first instruction is dependency-mispredicted.

Another exemplary aspect is directed to non-transitory computer-readable storage medium comprising code, which, when executed by a processor, causes the processor to perform operations for executing instructions in an instruction pipeline of the processor, the non-transitory computer-readable storage medium comprising: code for detecting a conditionality-imposing control instruction which imposes dependent behavior on a conditionality block size number of one or more dependent instructions; code for dependency-predicting that the first instruction is a dependent instruction of the conditionality-imposing control instruction, based on the conditionality block size and one or more parameters of the instruction pipeline, prior to executing a first instruction; code for executing the first instruction based on the dependency-prediction; and code for mitigating a penalty associated with the dependency-misprediction, when the first instruction is dependency-mispredicted.

BRIEF DESCRIPTION OF THE DRAWINGS

The accompanying drawings are presented to aid in the description of aspects of the invention and are provided solely for illustration of the aspects and not limitation thereof.

FIGS. 2A-B illustrates exemplary tables pertaining to instruction sizes and dependency-prediction rules.

DETAILED DESCRIPTION

Figure 1:
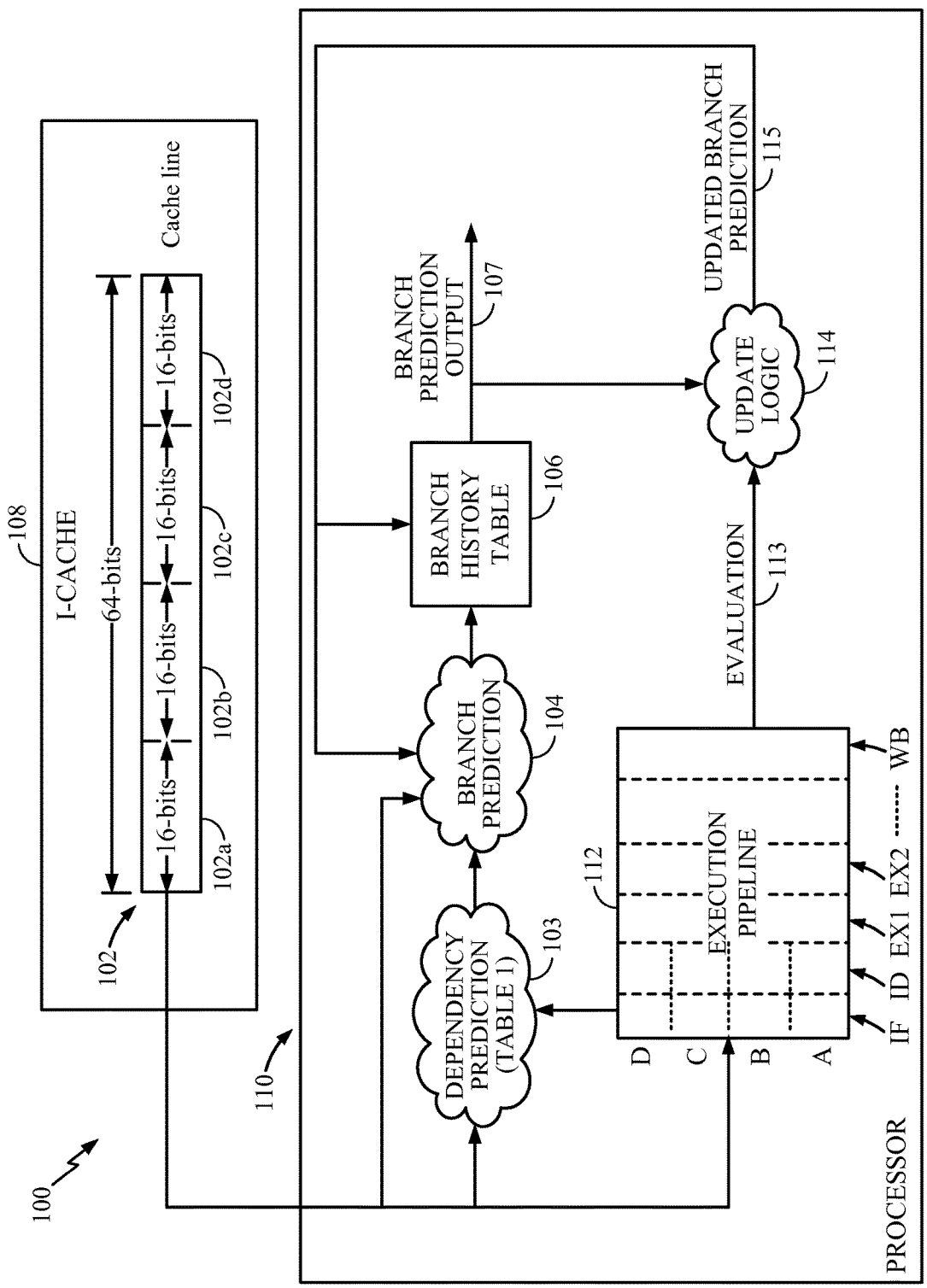
FIG. 1 illustrates a schematic of a processing system configured for dependency-prediction according to disclosed aspects.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects are directed to speeding up execution of instructions which follow a conditionality-imposing control instruction, wherein such instructions which follow the conditionality-imposing control instructions include dependent instructions of the conditionality-imposing control instruction. In this regard, assumptions are made about the likelihood of one or more instructions being dependent instructions. A basic assumption is that only an instruction which follows a conditionality-imposing control instruction can be a dependent instruction, and any instruction which precedes a conditionality-imposing control instruction will not be a dependent instruction. Further assumptions may be based on one or more characteristics or parameters related to the conditionality-imposing control instruction.

In general, the one or more parameters may include one or more of a maximum width of an instruction pipeline of a processor configured to execute instructions, instruction lengths that are supported by an instruction set architecture (ISA) implemented by the processor, and/or one or more pre-designated lanes occupied by a potential dependent instruction within a pipeline stage of the instruction pipeline.

In more detail, the parameters include the "block size," which as previously described, refers to a number of dependent instructions whose behavior depends on conditionality imposed by the conditionality-imposing control instruction. The parameters also relate to instruction set operating modes and/or instruction lengths supported by a processor or by an instruction set architecture (ISA) implemented in a processing system. The instruction set operating modes may include, for example, the ARM mode supporting 32-bit instructions and THUMB mode supporting 16-bit and 32-bit instructions. Thus the parameters related to the conditionality-imposing control instruction may also include a maximum width of an instruction pipeline or the number of instruction data bits processed in each clock cycle. In this regard, parallel execution of two or more instructions per clock cycle may be considered, where each of the two or more instructions may be aligned with one or more pre-designated lanes or positions within a pipeline stage. For example, a processor may be configured to process a maximum of 64 bits of instruction data every clock cycle. The 64 bits may be divided and ordered into four 16-bit or half-word lanes with pre-designated positions. Each one of these lanes may include one 16-bit instruction, one-half of a 32-bit instruction, or one-fourth of a 64-bit instruction, for example. Accordingly, the assumptions regarding the likelihood of an instruction being a dependent instruction of the conditionality-imposing control instruction may also be based on parameters such as one or more pre-designated lanes occupied by the instruction within a pipeline stage of the instruction pipeline.

Based on one or more of the above characteristics and/or parameters, aspects of this disclosure relate to predicting whether a particular instruction is dependent on a conditionality-imposing control instruction early in the instruction execution pipeline. This prediction is also referred to as "dependency-prediction" in this disclosure, as it relates to predicting whether or not an instruction is dependent on a conditionality-imposing control instruction. In other words, dependency-prediction relates to predicting whether an instruction is within the "conditionality block" (e.g., aforementioned IT block), which refers to the block of one or more instructions whose behavior is determined by conditionality imposed by the conditionality-imposing control instruction. The disclosed "dependency-prediction" is distinguished from conventional branch prediction which pertains to predicting the direction of a branch as taken or not-taken. To explain, a branch instruction which may follow a conditionality-imposing control instruction may have two distinct types of associated predictions. The first prediction may relate to dependency-prediction of whether or not the branch instruction is dependent on the conditionality-imposing control instruction. The second prediction may relate to conventional branch prediction techniques which may be in place to predict the direction of the branch instruction based on aspects such as a history of the branch instruction. If the branch instruction was predicted to be dependent on the conditionality-imposing control instruction based on the dependency-prediction, then the behavior of the branch will also be based on the conditionality imposed by the conditionality-imposing control instruction. Accordingly, once the branch instruction has been predicted to be dependent on the conditionality-imposing control instruction, the behavior of the branch instruction, i.e., whether the branch will be taken or not-taken, may be predicted based on the conventional prediction mechanisms.

It is possible, however, that in some cases, the dependency-prediction of an instruction may be wrong, or as may be referred to herein, the instruction may be "dependency-mispredicted." In the case of branch instructions for example, a first unconditional branch instruction may be dependency-predicted as a dependent instruction of a conditionality-imposing control instruction early in the pipeline, but in a later pipeline stage it may be determined that the dependency-prediction was incorrect, as the first unconditional branch instruction was in fact not within the conditionality-block of the conditionality-imposing control instruction. Thus, in these cases, the first unconditional branch instruction may have been treated as conditional, and based on the condition derived from the conditionality-imposing control instruction, the first unconditional branch instruction may have been predicted not-taken. An unconditional branch instruction being predicted as not-taken is an incorrect direction-prediction and an anomaly which leads to a "dependency-misprediction penalty." While these aspects pertaining to branch instructions are discussed in more detail in this disclosure, it will be understood that similar dependency-misprediction penalties may be incurred even in cases where instructions which are not branch instructions are dependency-mispredicted. Thus, if a first non-branch instruction is incorrectly assigned conditional behavior based on dependency-predicting the non-branch instruction to be a dependent instruction of a conditionality-imposing control instruction, then this dependency-misprediction may also incur a dependency-misprediction penalty. If the first non-branch instruction is dependency-mispredicted, it would be incorrect to commit the dependency-mispredicted first non-branch instruction. Thus, it will be understood that as discussed herein, a "dependency-misprediction penalty" pertains to penalties incurred when the dependency-prediction for an instruction (whether the instruction is a branch instruction or a non-branch instruction) is incorrect. The various dependency-misprediction penalties will be discussed in the following sections, along with exemplary aspects pertaining to mitigating the dependency-misprediction penalties.

In the above example of the unconditional branch instruction being incorrectly dependency-predicted to be dependent on a conditionality-imposing control instruction, the dependency-misprediction also leads to an incorrect direction-prediction or a direction-misprediction. The corresponding dependency-misprediction penalty may relate to the unconditional branch instruction, as well as instructions following the unconditional branch instruction to be incorrectly executed. Some aspects relate to mitigating this dependency-misprediction penalty by flushing or preventing from committing/updating memory, any instructions which may have followed the dependency-mispredicted instruction (e.g., any instructions which were executed following the first unconditional branch instruction being incorrectly predicted to be conditional and not-taken). Another aspect related to mitigating the dependency-misprediction penalty involves direction-predicting the dependency-mispredicted first unconditional branch instruction to obtain a prediction of a direction of the branch instruction. The aspect further comprises allowing the dependency-mispredicted first unconditional branch instruction to update a dynamic branch prediction tracking mechanism (e.g., a branch history register or a branch history table which keeps track of branch predictions and their accuracy) with the direction-misprediction. Updating the dynamic branch prediction tracking mechanism with the direction-misprediction causes the dynamic branch prediction tracking mechanism to be trained to learn that the first unconditional branch instruction was direction-mispredicted based on the dependency-misprediction. The dynamic branch prediction tracking mechanism can thus be trained to avoid making an incorrect direction-prediction (i.e., a not-taken prediction of an unconditional branch instruction) for future occurrences of the first unconditional branch instruction. Thereafter, the trained dynamic branch prediction tracking mechanism can correctly direction-predict future occurrences of the first instruction. Accordingly, once the branch prediction tracking mechanisms have been trained, the number of branch mispredictions based on dependency-mispredictions can be reduced.

In the example of the first non-branch instruction being incorrectly dependency-predicted to be dependent on a conditionality-imposing control instruction, the dependency-misprediction penalty may relate to the first non-branch instruction to be incorrectly executed. Further, it is possible that the first non-branch instruction may have a data dependency (e.g., have one or more common operands) with an instruction following the first non-branch instruction. Thus, these one or more instructions with one or more data dependencies on the first non-branch instruction, which follow the first non-branch instruction, may also be incorrectly executed. Accordingly, exemplary aspects relate to mitigating this dependency-misprediction penalty by preventing the first non-branch instruction from committing or updating a memory. In some aspects, the mitigation may further comprise quashing or flushing (or preventing from committing or updating memory) the first non-branch instruction, as well as these one or more instructions with one or more data dependencies which may have followed the dependency-mispredicted first non-branch instruction. Another aspect related to mitigating the dependency-misprediction penalty involves allowing the dependency-mispredicted first non-branch instruction to update a structure such as a conditionality history table which tracks the history of conditional instructions (such structures may be similar to the branch history table, but configured for non-branch conditional instructions). The conditionality history tables may be trained with the history of execution of instructions, such that if the dependency-mispredicted first non-branch instruction were allowed to update the conditionality history table with its incorrect execution on the first occurrence of its dependency-misprediction, then for following occurrences, the conditionality history table may learn the correct behavior for the first non-branch instruction. Accordingly, the conditionality history table may be used to override the dependency-misprediction of the first non-branch instruction once the correct behavior of the first non-branch instruction has been learned.

Accordingly, exemplary aspects may overcome the aforementioned drawbacks of conventional techniques and achieve expeditious and efficient execution of dependent instructions of conditionality-imposing control instructions, while reducing or eliminating frequency degradation, branch prediction penalties, and/or pipeline stalls. As seen from the above discussion, aspects are directed to acceleration of dependency-prediction of instructions early on, thus avoiding the necessity to first accurately determine whether or not an instruction is actually a dependent instruction by introducing pipeline stalls or slowing down execution frequency, etc.

Moreover, it will also be understood that in exemplary aspects, there may not be a significant increase in hardware costs, and exemplary aspects can be incorporated in existing processing systems. Further, because exemplary aspects may avoid pipeline stalls and implement aforementioned mitigation in cases of dependency-mispredictions, overall power consumption may be reduced.

An exemplary implementation of the above aspects will be discussed below with regard to processing system 100 of FIG. 1. For illustrative purposes, exemplary aspects will be discussed with regard to a case where a dependent instruction of a conditionality-imposing control instruction is a branch instruction. However, from the above discussion, it is seen that such dependent instructions are not limited to branch instructions, but may be any other instruction whose behavior is based on how the conditionality of the conditionality-imposing control instruction evaluates. For example, in some aspects, the dependent instruction can be a non-branch instruction such as a conditional ADD instruction, where if the condition is met, an ADD operation is performed using one or more source registers and the result is written to a destination register. If the condition is not met then the ADD operation is not performed and the destination register retains its previous value. Thus, in this case, dependent "behavior" of the ADD instruction pertains to whether the ADD instruction is executed or not (while in the case of a branch instruction, dependent "behavior" pertains to whether the branch instruction is taken or not-taken). Evaluation of the condition contained in the conditionality-imposing control instruction may be based on the result of a Compare instruction, for instance.

With reference now to FIG. 1, a schematic representation of processing system 100 is illustrated. Processing system 100 can be configured to implement exemplary aspects. Processing system 100 can include processor 110 coupled to instruction cache or I-cache 108, as illustrated. Processor 110 may be configured to receive instructions from instruction cache 108 and execute the instructions using for example, execution pipeline 112. While an instruction cache is illustrated in this representation, skilled persons will understand that the instructions may also be derived from a register file, for example, which may be integrated on a same integrated circuit or chip as processor 110. Execution pipeline 112 may include one or more pipelined stages, representatively illustrated as stages: instruction fetch (IF), instruction decode (ID), one or more execution stages EX1, EX2, etc., and a write back (WB) stage. Skilled persons will recognize numerous modifications and additions to execution pipeline 112, as known in the art. Processor 110 may also be coupled to numerous other components (such as data caches, IO devices, memory, etc.) which have not been explicitly shown and described herein for the sake of simplicity.

In one aspect, I-cache 108 is shown to comprise an example set of instructions 102a-d in cache line 102. As illustrated, 64-bits of cache line can be comprised of four 16-bit half-words, labeled 102a-d. As discussed herein, the half-words 102a-d occupy lanes A-D of execution pipeline 112 respectively, and the lane or lanes which a particular instruction and those preceding it span may be parameters used for dependency-predicting whether the particular instruction is a dependent instruction of a conditionality-imposing control instruction. It will be recognized that although the fetch and decode of 32-bit instructions may align with half-word boundaries or lanes A-D, the execution units which may execute 32-bit instructions need not necessarily conform to these lanes. In other words, all 32-bits of a 32-bit instruction which spans lanes A and B may be operated on by logic in EX1, EX2 stages of execution pipeline 112 without regard to the fact that the 32-bits were in fact spread across two lanes. Write back for 32-bit instructions also do not need to be performed in 16-bit chunks. Hence the EX1, EX2 and WB stages of instruction pipeline 112 have not been illustrated with the 16-bit wide lane demarcations in FIG. 1, whereas the IF and ID stages are shown with the lane demarcations. Moreover, it will also be understood that I-cache 108 may have additional information corresponding to cache line 102, such as an address, tags, and metadata, which are not explicitly illustrated here.

As previously mentioned, processing system 100 may be configured to support instructions in one or more formats or modes, including, without limitation, a 16-bit mode and a 32-bit mode. A 16-bit instruction would fit within one of the four half-word lanes A-D, while a 32-bit instruction would require two half-word lanes. Processing system 100 may also be configured to include one or more conditionality-imposing control instructions. The conditionality-imposing control instructions may be 16-bit instructions or 32-bit instructions, and they may impose conditions on 16-bit dependent instructions, 32-bit dependent instructions, or both.

An example conditionality-imposing control instruction has been previously described as an If-Then or IT instruction, which imposes conditionality on one dependent instruction. In other words, the IT instruction is known to affect a block of one dependent instruction. Similarly, a ITT or an ITE instruction would impose conditions on two dependent instructions or affect a block of two dependent instructions (an "ITE" instruction stands for an "If-Then-Else" instruction, which would operate thus: an "If" condition, if true, would cause a first dependent (Then) instruction's behavior to be according to the condition being true, and a second dependent (Else) instruction's behavior to be according to the condition being false. In other words, the Else instruction is based on the opposite resolution or false resolution of the If condition). Similarly, ITTT, ITTE, and ITEE affect a block of three dependent instructions; ITTTT, ITTTE, ITTEE, and ITEEE affect a block of four dependent instructions, and so on. In general, a type or class of conditionality-imposing control instructions which may be broadly referred to as an "IT type" or an "IT class" of instructions, in this disclosure, include any such combination of Then or Else instructions which follow an If instruction. In the below exemplary aspects, a maximum block size of four instructions of an IT class of instructions will be discussed, while it will be understood that aspects of this disclosure are not limited to any maximum block size.

In exemplary aspects, it is possible to determine the block size of the above conditionality-imposing control instructions early in the pipeline, for example, based on pre-decode bits. For example, when data or instructions are obtained from an L2 cache (not shown) to be placed into I-cache 108, pre-decoding may be performed to determine, that a conditionality-imposing control instruction is present within a particular cache line 102. When the particular cache line 102 is fetched from I-cache 108 (e.g., during the IF stage of execution pipeline 112), the block size of the conditionality-imposing control instruction may be determined Logic, such as a counter (not explicitly shown), may be initialized with this block size or count of the number of dependent instructions, which may indicate whether all of the dependent instructions within the block are contained within the cache line 102 or if there may be spillover into subsequent cache lines. As previously mentioned, a conditionality-imposing control instruction may occur at arbitrary locations in memory or in I-cache 108, for example. Thus, dependent instructions of a conditionality-imposing control instruction may fall within the same cache line or may spill over into a following cache line or fetch group. A block of instructions fetched and processed during one cycle in execution pipeline 112 may be referred to as a "fetch group." A fetch group of size 64-bits, for example, can have anywhere from two (32-bits) to four (16-bits) instructions. (It is also possible for the fetch group of size 64-bits to have three instructions, including one 32-bit instruction and two 16-bit instructions. Moreover, cases where a portion of an instruction is in one fetch group but the remainder of the same instruction is in the subsequent fetch group are also possible).

With the above information, aspects are configured to detect a conditionality-imposing control instruction, and, based on certain characteristics and/or parameters, make a dependency-prediction of whether instructions may be dependent instructions of the conditionality-imposing control instructions, or in other words, fall within conditionality blocks of the conditionality-imposing control instructions. The parameters may include block size of the conditionality-imposing control instruction, and information related to the instruction execution pipeline, such as pipeline stage, instruction mode and related information about possible instruction lengths, and positions/lanes of parallel execution related to a potential dependent instruction.

Representatively, the dependency-prediction of whether an instruction is a dependent instruction of a conditionality-imposing control instruction is shown to be performed in the block labeled as dependency prediction 103 of FIG. 1.

However, it will be understood that the functionality of dependency prediction 103 may be implemented in any combination of hardware and software or within any other logic block of processor 110, without requiring a standalone logic block. In an example, if a conditionality-imposing control instruction is present in a fetch group, which may coincide with cache line 102 fetched from I-cache 108, it may be possible to determine the block size of the conditionality-imposing control instruction in the same clock cycle that the fetch group is fetched. However, due to the latency incurred in determining the block size, it may not be possible to precisely determine which instructions following the conditionality-imposing control instruction in the fetch group are dependent instructions. In other words, it may be possible to detect partial information quickly, using selected bits of an op-code, for example, wherein the partial information may relate to determining that an instruction in a fetch group is a conditionality-imposing control instruction. However, it may not be possible to quickly determine the remaining relevant information such as block size.

With reference to the pipeline stages of execution pipeline 112, in an exemplary aspect, four half-words or 64-bits of cache line 102 may be fetched during the IF pipeline stage from I-cache 108. Detection of the block size of a conditionality-imposing control instruction may also be performed in this first clock cycle or the IF pipeline stage (from above, pre-decoding can reveal if there is a conditionality-imposing control instruction in cache line 102). In a second clock cycle or the ID pipeline stage, up to four 16-bit instructions may be decoded from the 64-bits of cache line 102. (Alternatively, the 64-bits may be decoded into three instructions comprising two 16-bit instructions and one 32-bit instruction, or two instructions comprising two 32-bit instructions.) Dependency prediction 103 and branch prediction (e.g., in the block labeled branch prediction 104) may operate in this second clock cycle or the ID stage. However, branch prediction output 107 may not have sufficient time in the ID stage to take into account the conditionality or dependency-prediction that is also calculated in the ID stage. Thus, results of dependency prediction 103 and branch prediction 104 are pipelined into a third clock cycle or EX1 stage. The final branch prediction output 107 which takes into account the results of dependency prediction 103 and branch prediction 104 is made available in this EX1 stage. Branch prediction output 107 in the EX1 stage can reveal, for example, whether an unconditional branch was incorrectly dependency-predicted and thus resulted in an erroneous outcome of being predicted not-taken.

Thus, considering a specific case, a 16-bit conditionality-imposing control instruction of block size=2 (e.g., an "ITT" instruction) may be present within the first lane, A, of a fetch group. The fetch group may be fetched in the first clock cycle or the IF pipeline stage. Since the block size can potentially be three or higher (i.e., for conditionality-imposing control instructions of the form ITTT or ITTTT), the detected 16-bit conditionality-imposing control instruction in lane A can potentially span the entire fetch group. In other words, all remaining lanes, B-D, of the fetch group can potentially be dependent instructions. Thus, if a conditionality-imposing control instruction is detected in a fetch group, then it is possible that the block size can span the entire fetch group. A potential dependent instruction (e.g., a branch instruction) which lies in the same fetch group may have be either correctly dependency-predicted or may be incorrectly dependency-predicted (or in other words, be dependency-mispredicted). Thus, in the case of the above IT instruction in lane A, while the dependency-prediction will be correct for a 16-bit branch instruction in lanes B and C, the dependency-prediction may be wrong for a 16-bit branch instruction in lane D.

With the above example case in mind, the following rules may be generally applicable for dependency-predicting whether an instruction is a dependent instruction of an IT instruction in processing system 100. If an instruction under consideration, say, a first instruction, follows an IT instruction and is in the same fetch group as the IT instruction, the dependency-prediction is that the first instruction is a dependent instruction of the IT instruction.

If the first instruction is not in the same fetch group as the IT instruction, the dependency-prediction is based on exemplary parameters as follows. The block size or number of dependent instructions in the conditionality block of the IT instruction is determined. The number of dependent instructions remaining in the conditionality block, i.e., the number of remaining dependent instructions that were not in the same fetch group as the IT instruction is determined. If the number of remaining dependent instructions left in the conditionality block is one (1), the first two lanes, i.e., lanes A and B are dependency-predicted to include dependent instructions. The second two lanes, i.e., lanes C and D are dependency-predicted to not include dependent instructions of the IT instruction. If the number of remaining dependent instructions left in the conditionality block is two (2), three (3), or four (4), then all four lanes A-D are dependency-predicted to include dependent instructions of the IT instruction. If the fetch width is greater than four lanes as in the above exemplary cases, then the above described general rules are applicable for the dependency-prediction, with a pattern of expanding the number of lanes that are dependency-predicted as including dependent instructions, by the maximum number of lanes a dependent instruction can occupy, for each remaining dependent instruction in the conditionality block of the IT instruction. For example, in the above examples, where the largest dependent instruction is a 32-bit instruction, the maximum number of lanes that the 32-bit instruction can occupy is two lanes. Therefore, the number of lanes that are dependency-predicted as including a dependent instruction are expanded by two lanes for each dependent instruction remaining in the conditionality block.

With continuing reference to FIG. 1, for implementing the above rules in dependency prediction 103, for example, once the block size of the conditionality-imposing control instruction is determined, a counter can be implemented to keep track of any remaining dependent instructions that may be present in subsequent fetch groups in subsequent clock cycles. In one aspect, this counter can be implemented in the ID stage of execution pipeline 112. Since dependent instructions may belong to two or more fetch groups, the dependent instructions may be present in two or more subsequent clock cycles following the clock cycle in which the conditionality-imposing control instruction is detected. Thus, the above general rules provide dependency-prediction based on the remaining dependent instructions in a fetch group.

In another illustrative example, the conditionality-imposing control instruction is an ITTTT instruction which occurs in lane D of a first fetch group in a first clock cycle. Thus, the conditionality block of the ITTTT instruction includes four 32-bit instructions. The four 32-bit dependent instructions will be fetched in two subsequent clock cycles in processing system 100 of FIG. 1. Since the ITTTT instruction is fetched in the first clock cycle in lane D, the block size will be determined by the end of the first clock cycle. Since the ITTTT instruction is in lane D and any dependent instructions of the ITTTT instruction need to follow the ITTTT instruction, it is known that no dependent instructions could have been fetched in the first clock cycle. Thus, by the beginning of the subsequent clock cycle, or a second clock cycle, it will be known that the number of remaining dependent instructions in the conditionality block is four, and all four remaining dependent instructions are yet to be fetched. On the other hand, if the ITTTT instruction is fetched in lane C instead of lane D, then up to one dependent instruction may be present in lane D. If the block size is four and if one dependent instruction is fetched in lane D, the counter would decrement the number of remaining dependent instructions in the second clock cycle from four to three. Accordingly, in a second fetch group fetched in the second clock cycle, the remaining block size or the number of remaining dependent instructions will be precisely known.

However, knowledge of the remaining block size or number of remaining dependent instructions, is not sufficient to know which instructions or which one(s) of lanes A-D in the second fetch group will include the dependent instructions, because parameters related to the instruction pipeline, instruction size, mode, lane, etc. will also affect the coverage or reach of the conditionality block. Thus, if the remaining block size in the second fetch group is three, then the dependent instructions may be three 32-bit instructions, and thus, the dependent instructions may span the entire 64-bits, i.e., lanes A-D, of the second fetch group, and also span 32-bits or lanes A-B of a third fetch group following the second fetch group. If the dependent instructions are 16-bit instructions, they may only span the first three lanes, A-C, of the second fetch group. Accordingly, the parameters used to assess whether instructions are dependent instructions may relate to the maximum possible span, (e.g., based on 32-bit instructions), for dependency-prediction in the second fetch group. In some aspects, dependency prediction 103 may be based on implementing features of exemplary TABLE 1 below.

With reference to FIG. 2A, TABLE 1 provides a list of all possible instructions that may appear in the four lanes A-D, with lane A including the oldest instruction and lanes B-D including successively younger instructions or instructions which follow the oldest instruction. A 16-bit instruction is denoted as T16 while a 32 bit instruction is denoted as T32.

In the case of dependency-prediction for a first instruction, where the first instruction is in the same fetch group as the one in which a conditionality-imposing control instruction is detected, the following possible scenarios are applicable, with reference to TABLE 1 of FIG. 2A. With reference to row 202, with a T16 instruction in each of the four lanes A-D, 24 scenarios arise, where the conditionality-imposing control instruction can be in any of the lanes A-C and corresponding next lanes or younger instructions include the first instruction. With reference to row 204, lanes A-C include T16 instructions and lane D includes the first half of a T32 instruction, which gives rise to 12 scenarios, wherein lanes A-B may include the conditionality-imposing control instruction and corresponding next lane includes the first instruction. The partial instruction in lane D is not relevant to the dependency-prediction of the first instruction. In similar manner, referring to row 206, lanes A and B include T16 instructions and lanes C and D include a T32 first half and a T32 second half respectively, which gives rise to 12 scenarios. In row 208, lane A includes a T16 instruction, lanes B and C include a T32 first half and T32 second half respectively, and lane D includes a T16 instruction, which gives rise to 12 scenarios. In row 210, lane A includes a T16 instruction, lanes B and C include a T32 first half and T32 second half respectively, and lane D includes another T32 first half, giving rise to 4 scenarios. In row 212, lanes A and B include a T32 first half and T32 second half, while lanes C and D include T16 instructions, giving rise to 12 scenarios. In row 214, lanes A and B include a T32 first half and T32 second half respectively, lane C includes a T16 instruction and lane D includes another T32 first half, giving rise to 4 scenarios. Finally in row 216, rows A and B include a T32 first half and T32 second half respectively, while rows C and D include another T32 first half and T32 second half respectively, giving rise to 4 scenarios. Thus, overall, with rows 202-216 taken into account, dependency-prediction involves 84 scenarios where the first instruction is in the same fetch group as the one in which the conditionality-imposing control instruction is detected.

In the case of dependency-prediction for a first instruction, where the first instruction is not in the same fetch group as the one in which a conditionality-imposing control instruction is detected, i.e., where the first instruction is in a fetch group following the one in which the conditionality-imposing control instruction is detected, the following possible scenarios are applicable, once again, with reference to TABLE 1 of FIG. 2A. It will be understood that in FIG. 2A, the only assumption is that the conditionality-imposing control instruction is not in the same fetch group as the first instruction, without regard, for example, to the position of the conditionality-imposing control instruction in the fetch group in its own fetch group. For example, the conditionality-imposing control instruction may have been present in any lane of a first fetch group, which caused remaining dependent instructions including the first instruction to be present in or belong to a second fetch group. FIG. 2A refers to this second fetch group, following a first fetch group in which the conditionality-imposing control instruction was fetched, for example.

With reference to row 202, with a T16 instruction in each of the four lanes A-D, 4 scenarios arise, where the first instruction can be in any one of the lanes A-D. With reference to row 204, lanes A-C include T16 instructions and lane D includes the first half of a T32 instruction, which gives rise to 4 scenarios, wherein the first instruction can be in any one of lanes A-C. In similar manner, referring to row 206, lanes A and B include T16 instructions and lanes C and D include a T32 first half and a T32 second half respectively, which gives rise to 12 scenarios. In row 208, lane A includes a T16 instruction, lanes B and C include a T32 first half and T32 second half respectively, and lane D includes a T16 instruction, which gives rise to 12 scenarios. In row 210, lane A includes a T16 instruction, lanes B and C include a T32 first half and T32 second half respectively, and lane D includes another T32 first half, giving rise to 8 scenarios. In row 212, lanes A and B include a T32 first half and T32 second half, while lanes C and D include T16 instructions, giving rise to 12 scenarios. In row 214, lanes A and B include a T32 first half and T32 second half respectively, lane C includes a T16 instruction and lane D includes another T32 first half, giving rise to 8 scenarios. Finally in row 216, rows A and B include a T32 first half and T32 second half respectively, while rows C and D include another T32 first half and T32 second half respectively, giving rise to 8 scenarios. Thus, overall, with rows 202-216 taken into account, dependency-prediction involves 88 scenarios where the first instruction is not in the same fetch group as the one in which the conditionality-imposing control instruction is detected.

While the above description of possible scenarios involved in dependency-prediction with references to TABLE 1 are exhaustive, FIG. 2B provides TABLE 2 which includes selected ones of the above-identified scenarios. IN TABLE 2, the first fetch group includes the conditionality-imposing control instruction. Once again, the block size or size of the conditionality block may not be known at the beginning of the first clock cycle. The second fetch group is a subsequent fetch group, fetched in a second clock cycle. The remaining block size or number of remaining dependent instructions is known at the beginning of the second clock cycle. Instructions which are not particularly relevant to this disclosure have been simply denoted no-operations or NOPs, including 16-bit NOPs, "T16NOP," and 32-bit NOPs, "T32NOP." However, this is not a limitation, and the T16NOP and T32NOP may be any valid 16-bit instruction (T16) or 32-bit instruction (T32) respectively. Similarly, a potential dependent instruction has been described as a branch instruction "B," for the sake of illustration, with a 16-bit branch instruction denoted as T16B and a 32-bit branch instruction denoted as T32B. Once again, other kinds of instructions such as the above-described ADD instruction, whose behavior is dependent on the conditionality-imposing control instruction can also be dependent instructions. Example 16-bit and 32-bit instructions have been shown in Table 1 as aligned to one or more of the four above-described lanes, A-D. Whether branch instruction B is correctly or incorrectly assessed is shown in the last column for each of the cases shown in blocks 252-266.

In blocks 252-254, a first fetch group, as it relates to a first clock cycle, is shown. More specifically with reference to block 252, a conditionality-imposing control instruction of conditionality block size=3 is fetched (e.g., ITTE or ITTT) in lane A. However, since this is the first fetch group, the block size is not known at the beginning of the first clock cycle. Therefore, instruction B in lane D is dependency-predicted as a dependent instruction. This dependency-prediction is based on one of the above-described scenarios pertaining to TABLE 2, where instruction B is in the same fetch group as the conditionality-imposing control instruction. The dependency-prediction for instruction B is correct for block 202, since lane D falls within the conditionality block of the ITTE or ITTT instruction.

In block 254, a conditionality-imposing control instruction of block size=2 (e.g., ITT/ITE) is fetched in the first group and first clock cycle. Once again, since block size is unknown at the beginning of the first clock cycle, instruction B in lane D is dependency-predicted as a dependent instruction in similar manner as in block 252. However, in this case, the dependency-prediction is wrong. Instruction B was dependency-mispredicted because the conditionality block size of two for the ITT/ITE instruction in lane A should not include T16B in lane D within its condition block. In this case, due to the dependency-misprediction, exemplary aspects relate to mitigating the dependency-misprediction penalty. Specifically, the mitigation relates to allowing branch instruction B to execute conditionally, even though it is in fact an unconditional instruction. As described previously, this mitigation technique involves correcting the incorrect execution further down in execution pipeline 112, which will be discussed further below.

With reference to blocks 256-266, the second fetch group is shown. The conditionality-imposing control instruction would have been detected in a previous clock cycle in the first fetch group. The number of remaining dependent instructions of the conditionality-imposing control instruction or the remaining block size would have been determined and is available at the beginning of the second clock cycle.

Specifically, with reference to block 256, the remaining block size=4. This means that the conditionality block in the previous cycle extends to all four lanes A-D, since a block size of 4 could span anywhere from 64 bits to 128 bits based on whether the instructions are 16-bit instructions or 32-bit instructions. Therefore, based on the above parameters related to instruction sizes and lanes, instruction B in lane D will be dependency-predicted as a dependent instruction. The dependency-prediction would be correct, because instruction B (T16B) is a 16-bit instruction, which indeed falls within the conditionality block in this case.

In block 258, on the other hand, the remaining block size=3. Once again, the conditionality block can potentially include all four lanes A-D. However, in fact, each of lanes A-C include 16-bit instructions which would exhaust the condition block, as shown. Therefore, with the same parameters as in block 256, the dependency-prediction of instruction B as a dependent instruction would be incorrect in block 258. Once again, this dependency-misprediction causes a misprediction penalty, which is mitigated by above noted mitigation techniques, discussed further below.

With reference to block 260, the remaining block size=2. However, once again, as in blocks 256-258, the conditionality block could span the entire second fetch group from lanes A-D since there may be two 32-bit instructions in the fetch group. Dependency-predicting instruction B as a dependent instruction may be based on parameters related to the above instruction sizes and lanes. Since instruction B is in fact a 32-bit instruction (T32B) spanning lanes C-D that follows another 32-bit instruction, instruction B the dependency-prediction of instruction B is correct in this case.

In block 262, once again, the remaining block size=2. Accordingly, once again, the same parameters apply as in blocks 256-260 regarding the conditionality block extending to the entirety of the second fetch group. However, in this case, the instructions are not 32-bit instructions. Instruction B (T16B) in lane D does not fall within the condition block, because the condition block would be exhausted by lanes A-B comprising 16-bit instructions. Therefore, in this case, the dependency-prediction of instruction B as a dependent instruction would be incorrect. Once again, this dependency-misprediction causes a misprediction penalty, which is mitigated by above noted mitigation techniques, discussed further below.

In block 264, the remaining block size=1. Regardless of whether the condition block spans one 16-bit instruction or one 32-bit instruction, the conditionality block would be exhausted within the first two lanes A-B of the second fetch group. Therefore, the parameters related to the scope of the condition block provide that the conditionality block cannot cover lanes C-D, and thus, instruction T16B in lane D would be known to be unconditional, or not a dependent instruction. Therefore instruction B would be correctly dependency-predicted as not being a dependent instruction.

In block 266, once again the remaining block size=1. Once again, the same parameters are used, as in block 264, related to the scope of the condition block extending to lanes A and B. However, as illustrated, the condition block is exhausted by one 16-bit instruction in lane A. Accordingly, the dependency-prediction of instruction B (T16B) as a dependent instruction would be incorrect. Once again, this dependency-misprediction causes a misprediction penalty, which is mitigated by above noted mitigation techniques, discussed further below.

Accordingly, based on the above characteristics of the conditionality-imposing control instruction and parameters related to instruction sizes and lane positions, dependency-prediction of potential instructions may be correctly or incorrectly performed by dependency prediction 103. Where these potential dependent instructions are branch instructions, the following explanation will be provided, reverting to FIG. 1. More specifically, the remaining logic blocks of FIG. 1, including branch prediction 104, BHT 106, and update logic 114 will be discussed for dependency-prediction of branch instructions which are dependency-predicted in accordance with TABLES 1 and 2 of FIGS. 2A-B.

With continuing reference to FIG. 1, processor 110 includes branch prediction 104 and a dynamic branch prediction tracking mechanism, branch history table (BHT) 106. BHT 106 may comprise a history of behavior of conditional branch instructions that traverse or have traversed through execution pipeline 112, for example. BHT 106 may be supplemented with hints for dynamic prediction of conditional branch instructions derived from branch prediction 104.

Branch prediction 104 may receive the addresses or program counter (PC) values of the instruction or instructions stored in cache line 102. These instructions may include true conditional branch instructions, i.e., branch instructions whose behavior is not contingent or dependent on a conditionality-imposing control instruction. The true conditional branch instructions have their conditionality present within the instruction itself, and do not have their conditionality imposed or derived from another instruction such as a conditionality-imposing control instruction. Branch prediction 104 may also receive the addresses of branch instructions which have been dependency-predicted as dependent branch instructions, from dependency prediction 103. Branch prediction 104 may include a global history of recently executed branch instructions including the true branch instructions and the dependency-predicted branch instructions. The global history is hashed with the corresponding addresses of either type of branch instructions to index into BHT 106, in order to read out a 2-bit saturating counter value, for example. The 2-bit saturating counter is used for training the branch prediction by traversing through the following four states based on the correctness of consecutive predictions: strongly-predicted not-taken, weakly-predicted not-taken, weakly-predicted taken, and strongly-predicted taken. The hashing and indexing may be performed, for example, by logic implementing hash or XOR functions on the PC value and prediction states. Thereafter, the value stored in the indexed location of BHT 106 may be read out as branch prediction output 107, which represents the predicted evaluation of the received branch instructions. Branch prediction output 107 may be available in the EX1 stage of instruction pipeline 112, in one exemplary aspect. It will be recalled that some of the branch instructions that are dependency-predicted by dependency prediction 103 as dependent instructions may in fact be unconditional branch instructions which have been dependency-mispredicted.

All of the received branch instructions, including the true conditional branch instructions and the dependency-predicted branch instructions (including those which are dependency-mispredicted), will hereafter be referred to as direction-predicted branch instructions. The terms "direction-prediction," "direction-predicted," "direction-predicting," etc., refer to prediction of the "direction" of branch instructions, and are distinguished from prediction of "dependency" or "dependency-prediction," as previously described.

Branch prediction output 107 may be an input to execution pipeline 112. Using branch prediction output 107, the direction of the direction-predicted branch instruction may be set as taken/not-taken, and the direction-predicted branch instruction may be speculatively executed based on the direction that has been set. Once the actual evaluation of the direction-predicted branch instruction is obtained, after traversing the various stages, such as EX1, EX2, etc., of execution pipeline 112, the evaluation may be output from execution pipeline 112 as evaluation 113. Update logic 114 may be provided to accept evaluation 113 as one input and branch prediction output 107 as another input to see if the prediction and actual evaluation match. If there is a mismatch, then the direction-predicted branch instruction would have been mispredicted. Any instructions that were speculatively executed following the speculative execution of the direction-predicted branch instruction would be flushed and prevented from writing back or committing in pipeline stage WB. Moreover, any unconditional branch instruction which has been direction-mispredicted may also be tracked, as these will correspond to branch instructions which are dependency-mispredicted. Update logic 114 may send out the updated prediction 115 to branch prediction 104 and BHT 106 to update the prediction/history for the branch instruction.

In case the instruction under consideration is a non-branch instruction, as previously mentioned, a conditionality history table can be implemented in some aspects (not shown in FIG. 1). The conditionality history table could be implemented with logic similar to BHT 106 and can be used to update evaluations of the non-branch instruction using update logic 114. Exhaustive details pertaining a non-branch instruction will be avoided in this disclosure as skilled persons will be able to extend the discussion of exemplary aspects pertaining to branch instructions to cases where the instructions are not branch instructions.

Aforementioned mitigation techniques will now be discussed for cases where dependency-misprediction occurs for an unconditional branch instruction. In this regard, BHT 106 will be updated with the direction-misprediction of the unconditional branch instructions which were incorrectly dependency-mispredicted in dependency prediction 103. Therefore, BHT 106 will develop a history or training regarding the correct behavior of these direction-mispredicted unconditional branch instructions. For example, the aforementioned 2-bit saturating counter will be trained towards a weakly-predicted taken state for the next occurrence of the direction-mispredicted unconditional branch instruction. For subsequent occurrences of the same direction-mispredicted unconditional branch the 2-bit saturating counter will saturate in a strongly-predicted taken state. Thus, for the subsequent direction-mispredicted unconditional branch instructions that were incorrectly dependency-mispredicted in dependency prediction 103 and sent to branch prediction 104 and BHT 106 to obtain branch prediction output 107, the correct direction-prediction can be obtained (i.e., an unconditional branch instruction will be correctly direction-predicted as taken). In this manner, mitigation of dependency-misprediction penalty can be achieved in exemplary aspects.

Similarly, for a dependency-mispredicted non-branch instruction, updating and training a conditionality history table (not shown) may be used for mitigating the associated dependency-misprediction penalty.

Figure 3:
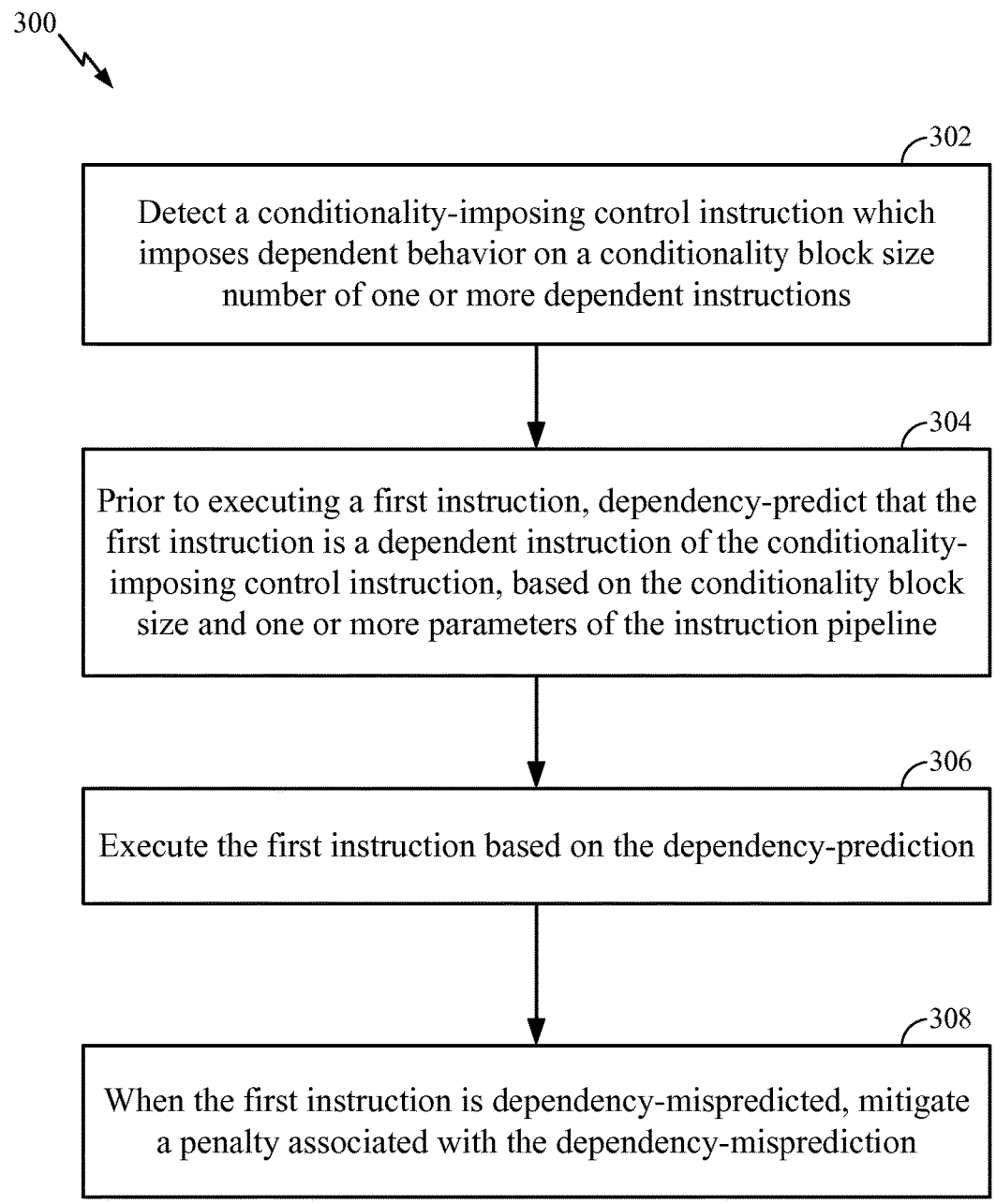
FIG. 3 illustrates an operational flow for a method of dependency-prediction according to exemplary aspects.

It will be appreciated that aspects include various methods for performing the processes, functions and/or algorithms disclosed herein. For example, as illustrated in FIG. 3, an aspect can include a method (300) of executing instructions in an instruction pipeline (e.g., instruction pipeline 112) of a processor (e.g., processor 110), the method comprising: detecting a conditionality-imposing control instruction (e.g., detecting an ITTE instruction in lane A of block 202 of FIG. 2; using, for example the logic block, dependency prediction 103 of FIG. 1) which imposes dependent behavior on a conditionality block size number of one or more dependent instructions (e.g., three dependent instructions in lanes B, C, and D of block 202 of FIG. 2; using, for example the logic block, dependency prediction 103 of FIG. 1)—Block 302; prior to executing a first instruction, dependency-predicting that the first instruction is a dependent instruction of the conditionality-imposing control instruction (e.g., using dependency prediction 103 of FIG. 1), based on the conditionality block size and one or more parameters of the instruction pipeline (e.g., parameters including, a maximum number of instruction bits in a fetch group fetched for execution in a cycle of execution pipeline 112, instruction sizes that are supported by processor 110, etc.; using, for example, dependency prediction 103 of FIG. 1)—Block 304; executing the first instruction based on the dependency-prediction (e.g., in pipeline 112 of FIG. 1, based on dependency prediction 103, branch prediction 104, and branch history table 106 in the case where the first instruction is a branch instruction)—Block 306; and when the first instruction is dependency-mispredicted, mitigating a penalty associated with the dependency-misprediction (e.g., by training branch prediction 104, branch history table 106, and execution pipeline 112 of FIG. 1)—Block 308.

Figure 4:
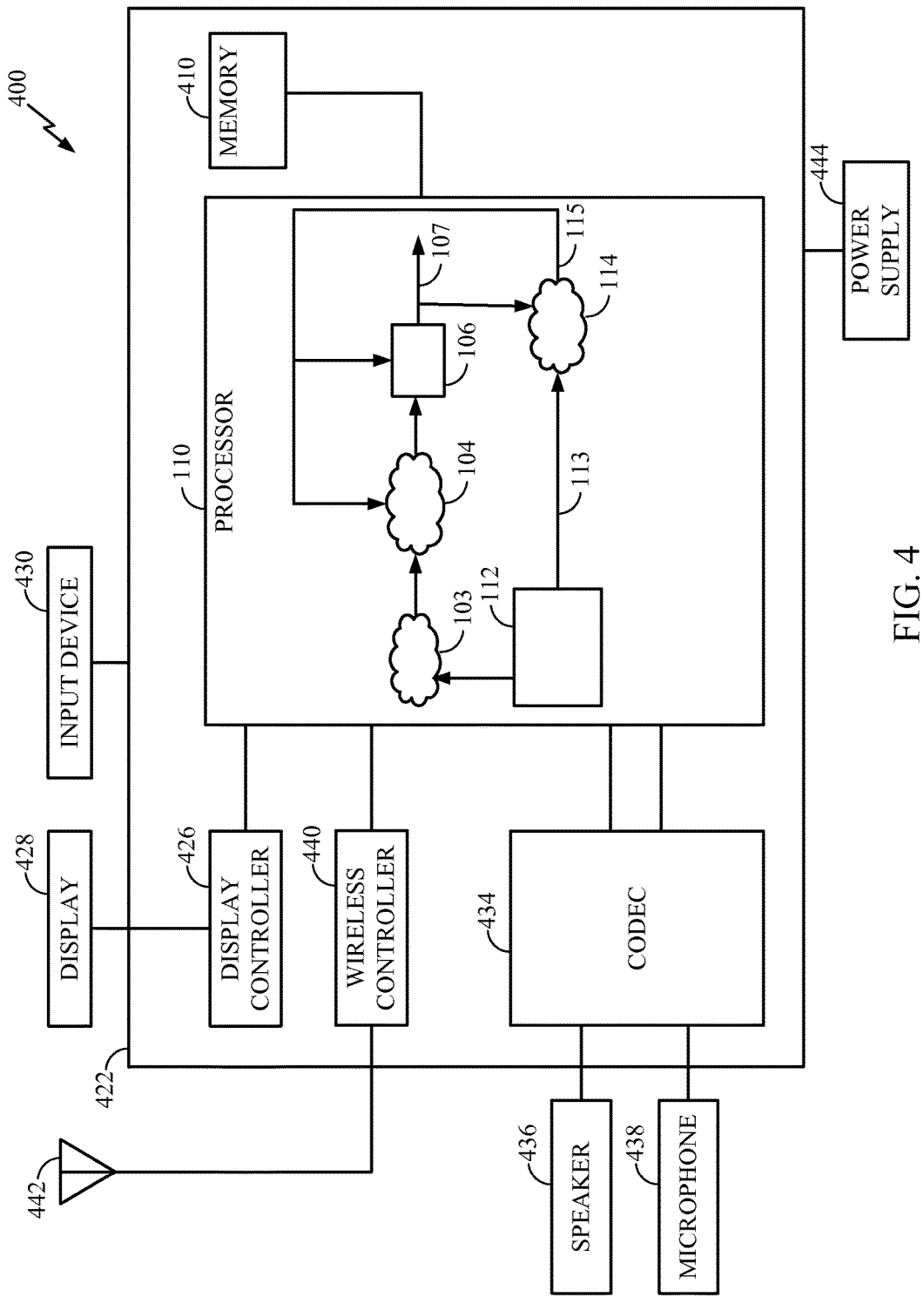
FIG. 4 illustrates an exemplary wireless device 400 in which an aspect of the disclosure may be advantageously employed.

Referring now to FIG. 4, a block diagram of a wireless device that is configured according to exemplary aspects is depicted and generally designated 400. Wireless device 400 includes processor 110 of FIG. 1, comprising the blocks dependency prediction 103, branch prediction 104, branch history table 106, execution pipeline 112, and update logic 114 as discussed above. Processor 110 may be communicatively to memory 410. I-cache 108 is not explicitly shown in this view but may be part of processor 110 or may be a separate block coupled between processor 110 and memory 410 as known in the art.

FIG. 4 also shows display controller 426 that is coupled to processor 110 and to display 428. Coder/decoder (CODEC) 434 (e.g., an audio and/or voice CODEC) can be coupled to processor 110. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, processor 110, display controller 426, memory 410, CODEC 434, and wireless controller 440 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, processor 110 and memory 410 may also be integrated into a set-top box, a music player, a video player, an entertainment unit, a navigation device, a personal digital assistant (PDA), a fixed location data unit, a computer, a laptop, a tablet, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for accelerated prediction of unconditional branches. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of executing instructions in an instruction pipeline of a processor, the method comprising:

detecting a conditionality-imposing control instruction which imposes dependent behavior on a conditionality block size number of one or more dependent instructions;

prior to executing a first instruction, dependency-predicting that the first instruction is a dependent instruction of the conditionality-imposing control instruction, based on the conditionality block size and one or more parameters of the instruction pipeline;

executing the first instruction based on the dependency-prediction; and when the first instruction is dependency-mispredicted, mitigating a penalty associated with the dependency-misprediction.

2. The method of claim 1, wherein the first instruction and the conditionality-imposing control instruction belong to a same fetch group.

3. The method of claim 1, wherein the first instruction belongs to a second fetch group following a first fetch group in which the conditionality-imposing control instruction was fetched.

4. The method of claim 1, wherein the one or more parameters comprise one or more of a maximum width of the instruction pipeline, instruction lengths that are supported by an instruction set architecture (ISA) implemented in the processor, or one or more pre-designated lanes occupied by the first instruction within a pipeline stage of the instruction pipeline.

5. The method of claim 1, wherein the first instruction is a branch instruction.

6. The method of claim 5, further comprising direction-predicting the branch instruction to obtain a prediction of a direction of the branch instruction.

7. The method of claim 6, further comprising determining that the direction-prediction is incorrect where the branch instruction is an unconditional branch instruction, and mitigating the penalty comprises training a branch prediction tracking mechanism by updating the branch prediction tracking mechanism with the incorrect direction-prediction.

8. The method of claim 7, further comprising correctly direction-predicting future occurrences of the first instruction based on the trained branch prediction tracking mechanism.

9. The method of claim 1, wherein mitigating the penalty comprises preventing the first instruction from committing or updating a memory.

10. The method of claim 9, further comprising preventing one or more instructions following the first instruction and having a data dependency with the first instruction, from committing or updating the memory.

11. The method of claim 1, wherein the conditionality-imposing control instruction belongs to an If-Then (IT) class of instructions.

12. A processing system comprising:
a processor configured to execute instructions in an instruction pipeline;
dependency prediction logic configured to:
detect a conditionality-imposing control instruction which imposes dependent behavior on a conditionality block size number of one or more dependent instructions; and
prior to executing a first instruction, dependency-predict that the first instruction is a dependent instruction of the conditionality-imposing control instruction, based on the conditionality block size and one or more parameters of the instruction pipeline;
wherein the processor is configured to execute the first instruction based on the dependency-prediction; and
logic configured to mitigate a penalty associated with the dependency-misprediction when the first instruction is dependency-mispredicted.

13. The processing system of claim 12, wherein the first instruction and the conditionality-imposing control instruction belong to a same fetch group.

14. The processing system of claim 12, wherein the first instruction belongs to a second fetch group following a first fetch group in which the conditionality-imposing control instruction was fetched.

15. The processing system of claim 12, wherein the one or more parameters comprise one or more of a maximum width of the instruction pipeline, instruction lengths that are supported by an instruction set architecture (ISA) implemented in the processor, or one or more pre-designated lanes occupied by the first instruction within a pipeline stage of the instruction pipeline.

16. The processing system of claim 12, wherein the first instruction is a branch instruction.

17. The processing system of claim 16, further comprising branch prediction tracking mechanism to direction-predict the branch instruction to obtain a prediction of a direction of the branch instruction.

18. The processing system of claim 17, further comprising logic configured to determine that the direction-prediction is incorrect where the branch instruction is an unconditional branch instruction, and wherein the logic configured to mitigate the penalty comprises logic configured to train the branch prediction tracking mechanism by updating the branch prediction tracking mechanism with the incorrect direction-prediction.

19. The processing system of claim 18, wherein the branch prediction tracking mechanism is further configured to correctly direction-predict future occurrences of the first instruction based on the trained branch prediction tracking mechanism.

20. The processing system of claim 12, wherein the logic configured to mitigate the penalty comprises logic configured to prevent the first instruction from committing or updating a memory.

21. The processing system of claim 20, further comprising logic configured to prevent one or more instructions following the first instruction and having a data dependency with the first instruction, from committing or updating the memory.

22. The processing system of claim 12, wherein the conditionality-imposing control instruction belongs to an If-Then (IT) class of instructions.

23. A processing system comprising:
means for executing instructions in an instruction pipeline;
means for detecting a conditionality-imposing control instruction which imposes dependent behavior on a conditionality block size number of one or more dependent instructions;
means for dependency-predicting that the first instruction is a dependent instruction of the conditionality-imposing control instruction, based on the conditionality block size and one or more parameters of the instruction pipeline, prior to executing a first instruction;
wherein the means for executing the instructions in the instruction pipeline comprises means for executing the first instruction based on the dependency-prediction; and
means for mitigating a penalty associated with the dependency-misprediction, when the first instruction is dependency-mispredicted.

24. The processing system of claim 23, wherein the first instruction and the conditionality-imposing control instruction belong to a same fetch group.

25. The processing system of claim 23, wherein the first instruction belongs to a second fetch group following a first fetch group in which the conditionality-imposing control instruction was fetched.

26. The processing system of claim 23, wherein the one or more parameters comprise one or more of a maximum width of the instruction pipeline, instruction lengths that are supported by an instruction set architecture (ISA) implemented in the processor, or one or more pre-designated lanes occupied by the first instruction within a pipeline stage of the instruction pipeline.

27. The processing system of claim 23, further comprising means for direction-predicting the first instruction to obtain a prediction of a direction of the first instruction, wherein the first instruction is a branch instruction.

28. The processing system of claim 27, further comprising means for determining that the direction-prediction is incorrect where the branch instruction is an unconditional branch instruction, and wherein the means for mitigating the penalty comprises means for training a branch prediction tracking mechanism using the incorrect direction-prediction.

29. The processing system of claim 28, further comprising means for correctly direction-predicting future occurrences of the first instruction based on the trained branch prediction tracking mechanism.

30. A non-transitory computer-readable storage medium comprising code, which, when executed by a processor, causes the processor to perform operations for executing instructions in an instruction pipeline of the processor, the non-transitory computer-readable storage medium comprising:

code for detecting a conditionality-imposing control instruction which imposes dependent behavior on a conditionality block size number of one or more dependent instructions;

code for dependency-predicting that the first instruction is a dependent instruction of the conditionality-imposing control instruction, based on the conditionality block size and one or more parameters of the instruction pipeline, prior to executing a first instruction;

code for executing the first instruction based on the dependency-prediction; and code for mitigating a penalty associated with the dependency-misprediction, when the first instruction is dependency-mispredicted.

* * * * *